United States Patent
Lang et al.

(10) Patent No.: US 12,194,920 B2
(45) Date of Patent: Jan. 14, 2025

(54) INDIRECT REAR VIEW SYSTEM WITH CONTACT AREAS OF A BEARING ELEMENT ON BOTH SIDES OF A SEPARATION SURFACE, LOAD-OPTIMIZED ADJUSTMENT BALL, AND ASSEMBLY METHOD FOR AN INDIRECT REAR VIEW SYSTEM

(71) Applicant: MEKRA Lang GmbH & Co. KG, Ergersheim (DE)

(72) Inventors: Werner Lang, Ergersheim (DE); Elmar Finkenberger, Adelshofen (DE); Albrecht Popp, Weihenzell (DE)

(73) Assignee: MEKRA Lang GmbH & Co. KG, Ergersheim (DE)

( * ) Notice: Subject to any disclaimer, the term of this patent is extended or adjusted under 35 U.S.C. 154(b) by 0 days.

(21) Appl. No.: 17/713,345

(22) Filed: Apr. 5, 2022

(65) Prior Publication Data

US 2022/0314882 A1  Oct. 6, 2022

(30) Foreign Application Priority Data

Apr. 6, 2021 (DE) .......................... 102021108507.1

(51) Int. Cl.
*B60R 1/04* (2006.01)
*F16C 11/08* (2006.01)

(52) U.S. Cl.
CPC .............. *B60R 1/04* (2013.01); *F16C 11/08* (2013.01)

(58) Field of Classification Search
CPC ... B60R 1/04; B60R 1/06; B60R 1/076; F16C 11/00; F16C 11/06; F16C 11/08; F16C 11/083

(Continued)

(56) References Cited

U.S. PATENT DOCUMENTS 2,104,099 A   1/1938  Ponce
2,457,639 A   12/1948 Brooks
(Continued)

FOREIGN PATENT DOCUMENTS

DE   38 04 137   8/1989
EP   2 078 638   7/2009
(Continued)

OTHER PUBLICATIONS

German Office Action (w/ English translation) for corresponding Application No. DE 10 2021 108 507.1, dated Oct. 14, 2021, 6 pages.

(Continued)

*Primary Examiner* — Terrell L McKinnon
*Assistant Examiner* — Michael McDuffie
(74) *Attorney, Agent, or Firm* — Dority & Manning, P.A.

(57) ABSTRACT

The invention relates to an indirect rear view system for a motor vehicle, having a bearing element for fastening at least one reflection element, wherein the bearing element forms a coupling region for variable-position attachment to a vehicle-attachable adjustment element, wherein the coupling region for contacting a spherical connection region of the adjustment element has a first contact area and a second contact area axially offset with respect thereto wherein an imaginary separation surface extends through the region of transition of a main body of the bearing element into the coupling region of the bearing element, wherein the first contact area is arranged on one side of the imaginary separation surface and the second contact area is arranged on the opposite other side of the imaginary separation surface. The invention also relates to an assembly method for coupling a bearing element of the indirect rear view system according to the invention to the adjustment element, (Continued)

Figure 1:
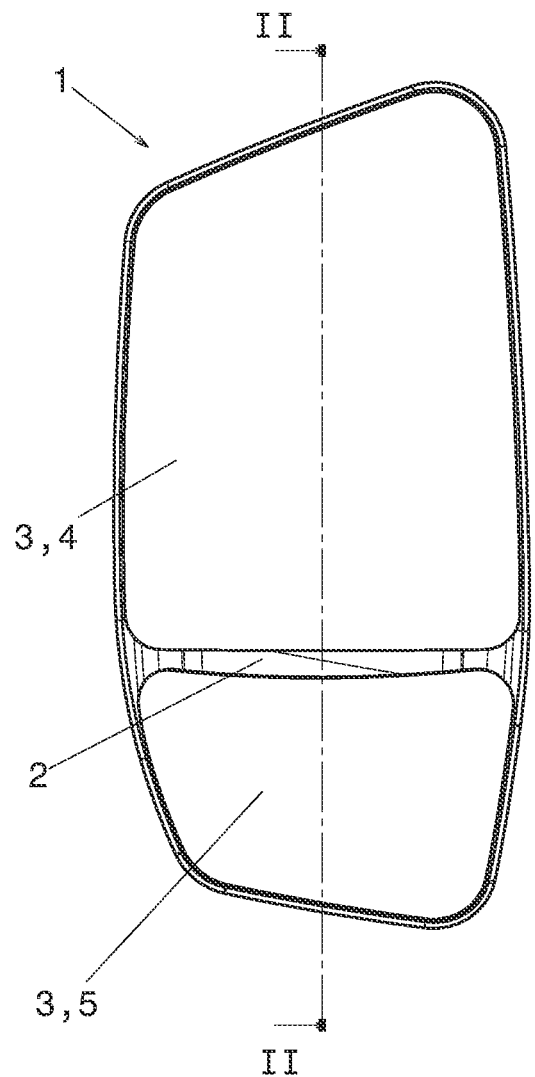

wherein the bearing element is moved from the direction of the reflection element towards the adjustment element.

20 Claims, 8 Drawing Sheets

(58) Field of Classification Search
USPC ............ 248/481, 466, 475.1, 476, 479, 485, 248/288.11, 288.31, 288.51; 359/876, 359/840, 871, 872
See application file for complete search history.

(56) References Cited

U.S. PATENT DOCUMENTS

| | | | |
|---|---|---|---|
| 2,588,825 A | 3/1952 | Goodman et al. | |
| 2,615,368 A * | 10/1952 | Bindley | B60R 1/04 248/481 |
| 3,391,895 A * | 7/1968 | Bausch | B60R 1/04 248/467 |
| 3,425,657 A | 2/1969 | Edward | |
| 3,448,553 A * | 6/1969 | Mahler | B60R 1/04 248/481 |
| 3,609,014 A * | 9/1971 | Kurz, Jr. | B60R 1/072 74/89.41 |
| 3,734,447 A * | 5/1973 | Perison, Sr. | B60R 1/06 248/481 |
| 3,901,587 A * | 8/1975 | Haile | G02B 7/1824 359/872 |
| 4,887,894 A * | 12/1989 | Gluzerman | G02B 7/1821 359/876 |
| 4,941,638 A * | 7/1990 | DiSalvatore | G02B 5/08 359/872 |
| 4,991,950 A * | 2/1991 | Lang | B60R 1/0612 248/479 |
| 5,109,301 A * | 4/1992 | Yang | B60R 1/10 359/872 |
| 6,467,919 B1 * | 10/2002 | Rumsey | B60R 1/04 359/872 |
| 6,843,575 B2 * | 1/2005 | Wachi | B60R 1/04 359/872 |
| 6,991,202 B2 * | 1/2006 | Carmona | F16M 11/14 248/229.14 |
| 7,108,384 B1 | 9/2006 | Athanassiou et al. | |
| 7,209,278 B2 * | 4/2007 | Lawlor | B60R 1/04 359/872 |
| 7,287,868 B2 * | 10/2007 | Carter | G02B 7/182 359/872 |
| 7,637,683 B2 * | 12/2009 | Lang | F16C 11/0604 359/876 |
| 8,210,695 B2 * | 7/2012 | Roth | B60R 1/12 359/872 |
| 8,702,254 B1 * | 4/2014 | Englander | B60R 1/072 359/872 |
| 8,960,629 B2 * | 2/2015 | Rizk | F16M 11/14 248/481 |
| 2017/0282802 A1 | 10/2017 | Sugimura | |
| 2017/0282804 A1 | 10/2017 | Sugimura et al. | |
| 2022/0089092 A1 * | 3/2022 | Hamlin | B60R 1/04 |
| 2022/0317413 A1 * | 10/2022 | Lang | G02B 7/182 |

FOREIGN PATENT DOCUMENTS

| | | |
|---|---|---|
| JP | 2002067798 A | 3/2002 |
| JP | 2002187481 A | 7/2002 |
| JP | 3702917 | 10/2005 |
| JP | 4996644 | 10/2010 |
| JP | 2017178216 A | 10/2017 |
| JP | 2017178223 A | 10/2017 |
| JP | 2018154287 A | 10/2018 |
| KR | 100800364 | 2/2008 |

OTHER PUBLICATIONS

Extended European Search Report for corresponding European Application No. EP22163724.2, dated Aug. 29, 2022, 9 pages.
Korean Office Action (w/ English translation) for corresponding Application No. 10-2022-0042439, dated Aug. 20, 2023, 13 pages.
Notice of Decision to Grant a Patent issued by the Japanese Patent Office for corresponding application No. 2022-063231, dated Oct. 2, 2023, 3 pages.
Japanese Office Action (w/ English translation) for corresponding Japanese Application No. 2022-063231, dated Apr. 18, 2023, 9 pages.
Brazilian Office Action (w/ English translation) for corresponding Application No. BR102022005304-9, dated Oct. 2, 2024, 7 pages.

* cited by examiner

Fig. 3
Fig. 4
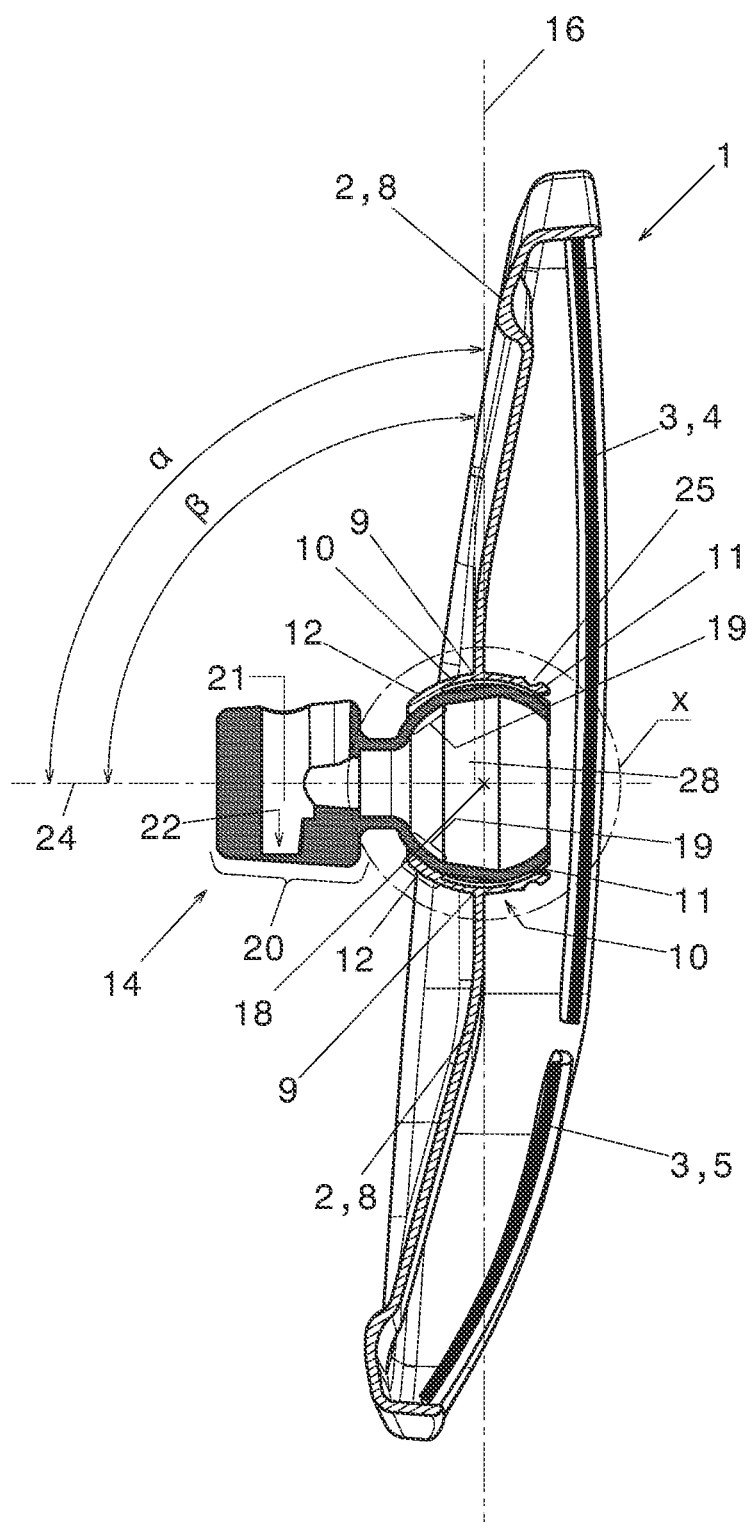
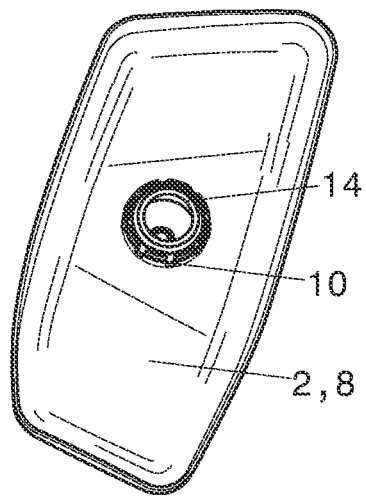

Fig. 5
Fig. 6
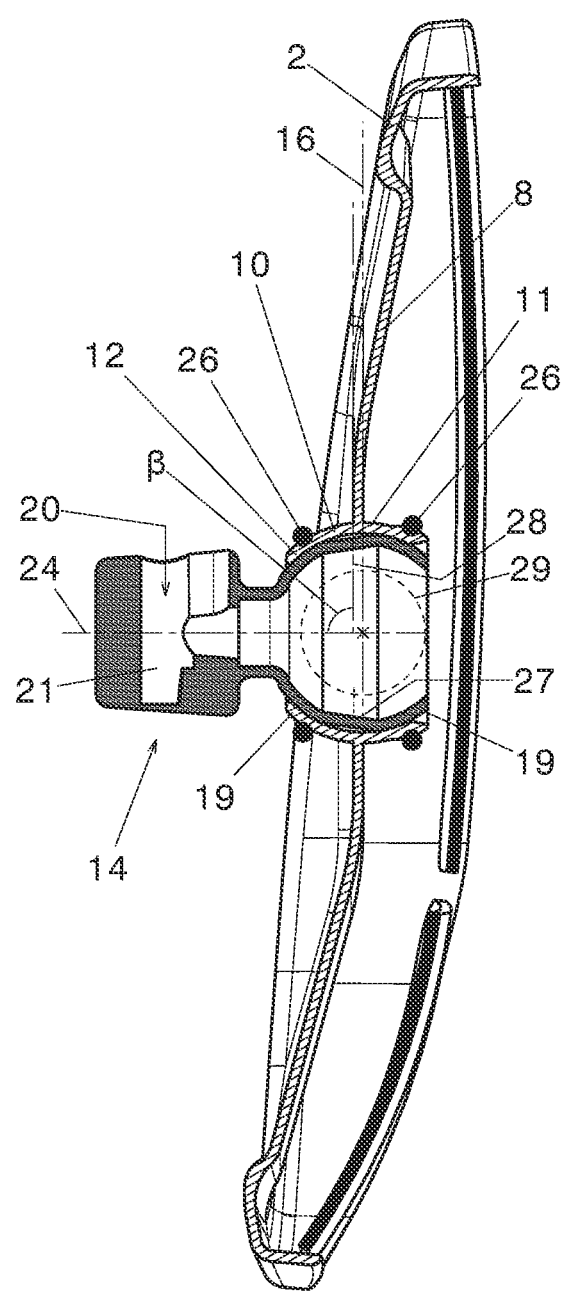
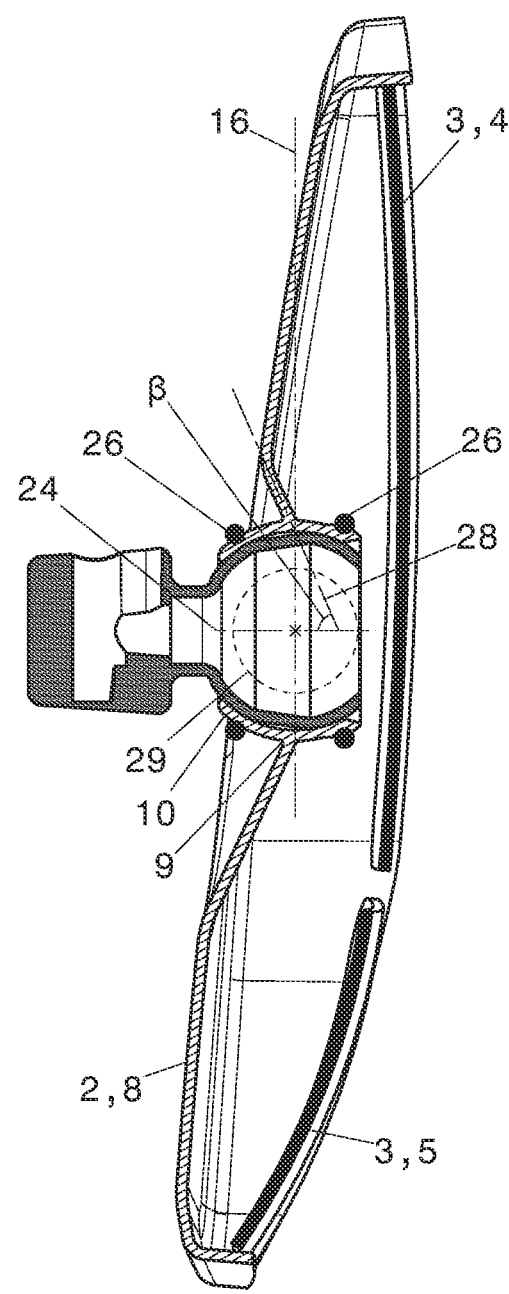

Fig. 7
Fig. 8
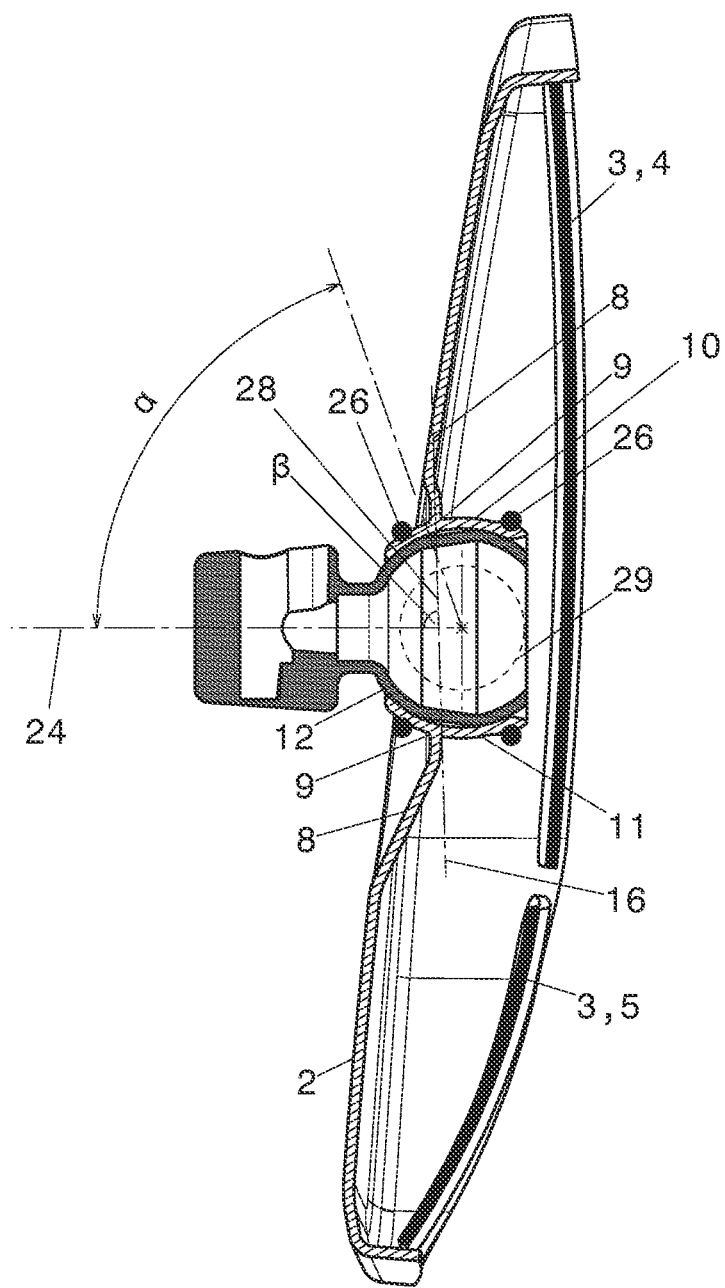
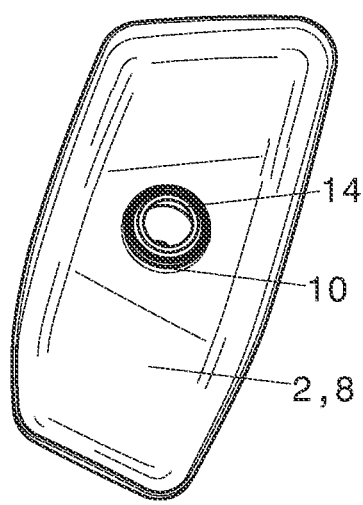

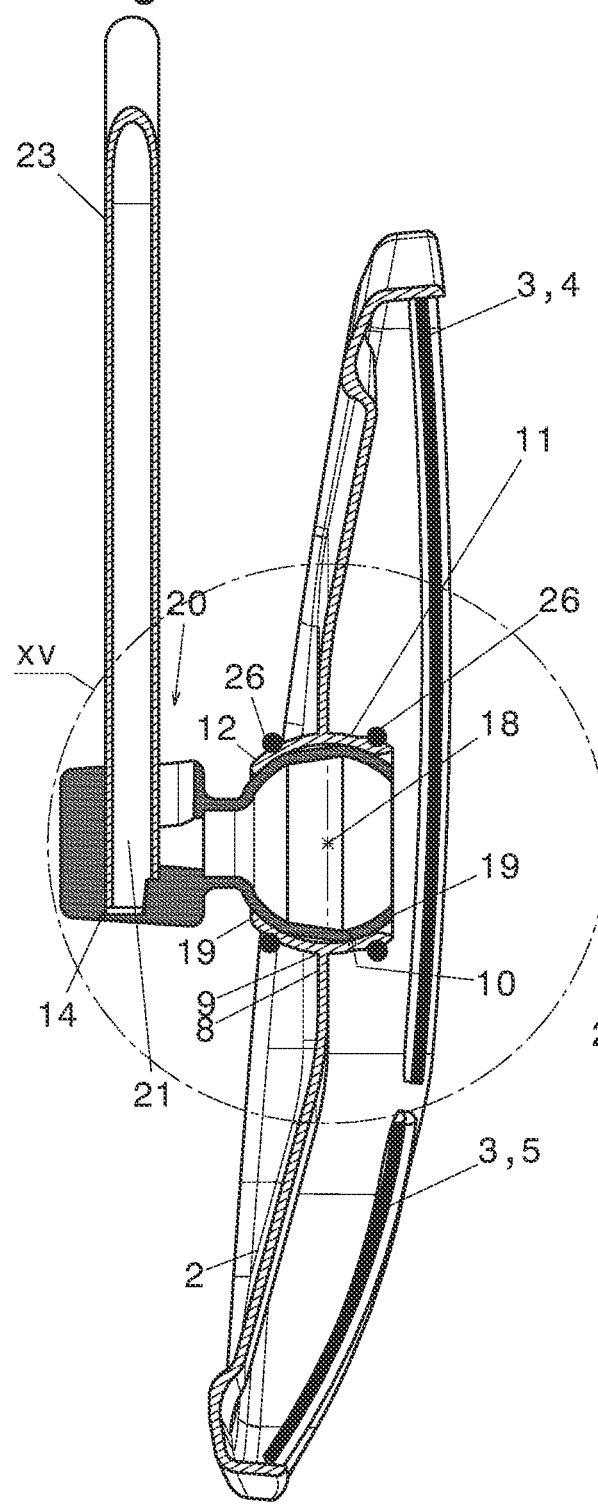
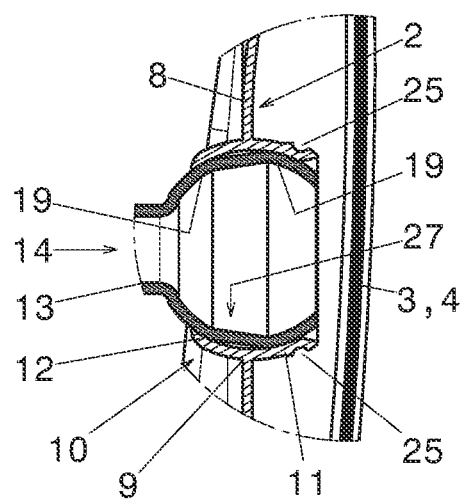
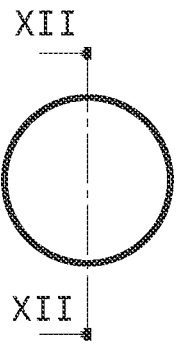
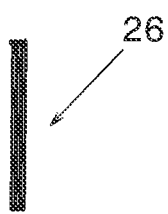
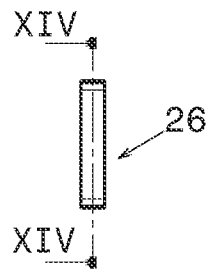
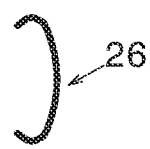

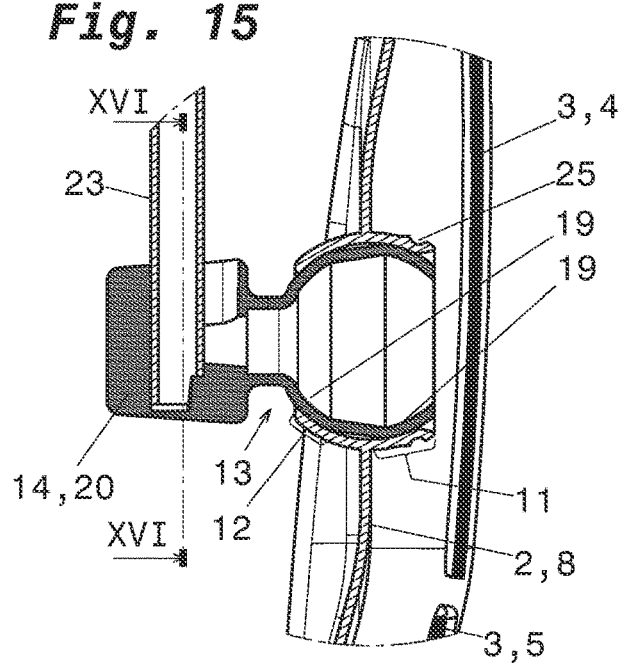
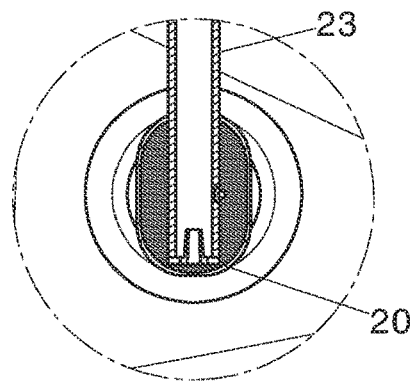
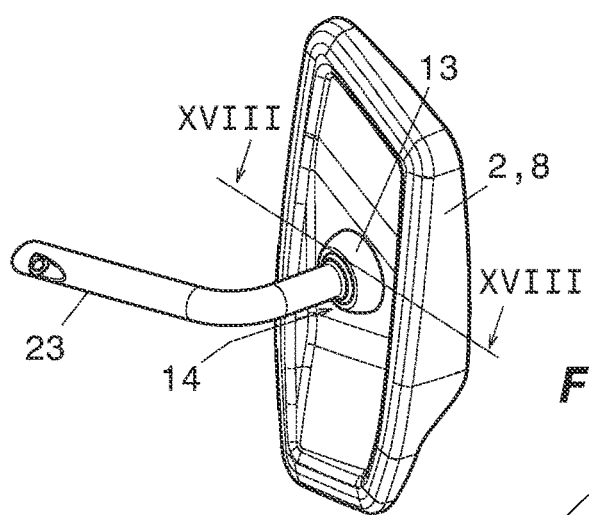
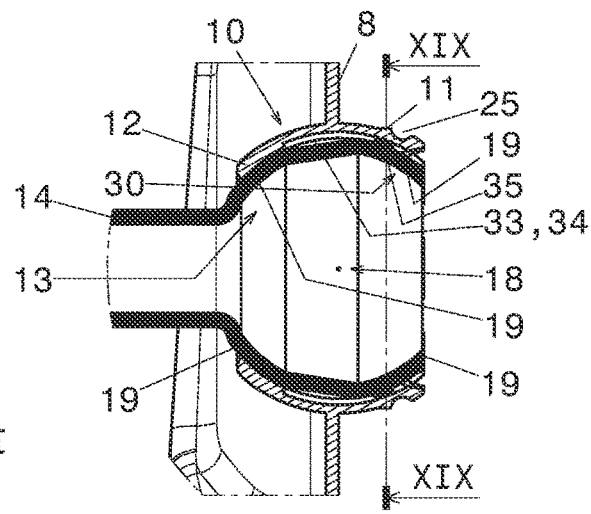
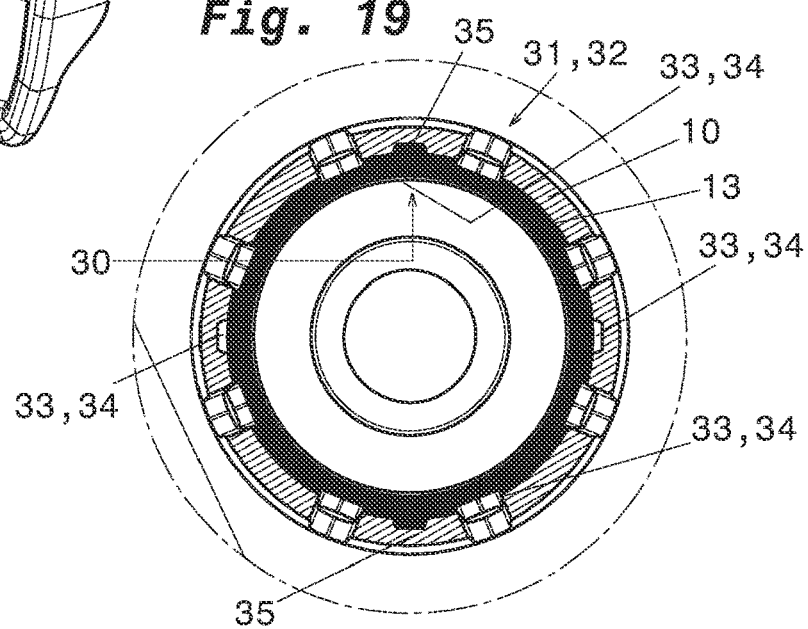

INDIRECT REAR VIEW SYSTEM WITH CONTACT AREAS OF A BEARING ELEMENT ON BOTH SIDES OF A SEPARATION SURFACE, LOAD-OPTIMIZED ADJUSTMENT BALL, AND ASSEMBLY METHOD FOR AN INDIRECT REAR VIEW SYSTEM

This application claims the benefit of priority to German Patent Application DE102021108507.1, filed on Apr. 6, 2021, the disclosure of which is incorporated by reference herein in its entirety.

The invention relates to an indirect rear view system for a motor vehicle, such as a utility vehicle, an agricultural/construction machine, for example a tractor, a truck, a bus and/or a transporter, having a bearing/support element for fastening at least one reflection element, such as a mirror glass, wherein the bearing element forms a coupling region for position-variable fixing/attachment to an adjustment element which in turn is attachable to or attached to the vehicle, wherein the coupling region is provided, for example, approximately close to the center/midpoint of the bearing element and has a first contact area and a second contact area axially offset with respect thereto for contacting a spherical connection region of the adjustment element, for example by applying pressure, such as by force-fitting and/or form-fitting means, wherein the axial direction is fixed/defined by the assembly/joining/insertion direction of the adjustment element into the bearing element (or a horizontal axis preferably by a pivot point about which the bearing element is pivotable), wherein an imaginary separation surface/plane runs through the region of a transition of a main body of the bearing element into the coupling region of the bearing element.

The separation surface runs through the region of transition from the main body of the bearing element to the coupling region of the bearing element on both sides of the pivot point. Different spatial configurations of the separation surface are possible. For example, free-surface designs may be implemented. In particular, the separation surface may be planar, i.e. flat, and in this special case forms a separation plane.

Various adjustment units are known from the prior art. For example, the German patent DE 101 63 318 C1 originates from the Applicant. There, an articulated assembly is protected, namely an articulated device for arranging two components at an angle to each other, in particular for rear-view mirrors with an adjustable mirror pane, comprising a first articulated component having a ball socket, a second articulated component having a projection substantially in the form of a spherical section fitted into the ball socket, a sliding part and a connecting device for producing a clamping connection between the first articulated component, the sliding part and the second articulated component, wherein the mutually facing sides of the ball socket, the sliding part and the projection each have a convex structuring and a concave structuring formed complementary thereto, wherein a first and a second axis of rotation are defined by the structuring between the sliding part, the ball socket and the projection. It is particularly noted that the concave structuring is more curved than the convex structuring, at least in the unloaded state.

The European patent EP 3 335 938 B1 also originates from the Applicant. In this patent, a ball joint device for the adjustable arrangement of a first and a second articulated component around a pivot point is protected. Here, the patented ball joint device has a spherical surface element, at the first articulated component with an outer side, which is part of a spherical surface and has a first radius of curvature with a first center point. An engagement device on the second articulated component contacting the spherical surface element with a first contact surface is also provided. Also, said device has a concave, spherical, cap-shaped receptacle disposed within the spherical surface element on the first or second articulated component having a second radius of curvature with a second center point. The second or first articulated component includes a concave spherical cap. The second or first articulated component has a convex spherical cap supported by a second contact surface in the spherical, cap-shaped receptacle. In this regard, the first radius of curvature is greater than the second radius of curvature. The insert device engages over the spherical surface element and the two articulated components with each other in the manner of a push-button connection. It is protected as a special feature in this older patent that the spherical surface element is formed in sections in the shape of a spherical ring, and that the spherical surface element has a plurality of spherical ring-shaped sections distributed over the circumference.

It is the object of the present invention to reduce or at best to eliminate the disadvantages known from the prior art.

According to the invention, this object is solved in a generic indirect rear view system in that the first contact area is arranged on one side of the imaginary separation surface and the second contact area is arranged on the opposite other side of the imaginary separation surface.

In this way, an indirect rear view system/view system is provided for a vehicle, which has a robust and compact adjustment mechanism. A particularly favorable force flow path is created from the active surfaces of the adjustment of the bearing element and the overall component (bearing element). The load distribution is optimized. Tension peaks or overloads are avoided. This rules out the possibility of damage and/or failure.

In other words, a particularly load-optimized indirect view system for a vehicle is presented, comprising/consisting of at least one reflection element for indirect view, a bearing element and an adjustment element, wherein the bearing element accommodates the reflection element and has a contact area with active surfaces to the adjustment element, wherein the adjustment element has a direct or indirect connecting area, i.e. with or without further intermediate parts, to the vehicle and has additional active surfaces to the bearing element, wherein the bearing element and the adjustment element can be pivoted/swiveled to each other via a pivot point by means of the respective contact areas, wherein the special aspect is to be seen precisely in the fact that the bearing element has a rear wall, which is arranged behind the reflection element, which divides the contact area into an inner contact area and an outer contact area, wherein the inner contact area is arranged between the rear wall and the reflection element, and wherein the outer contact area is arranged displaced in the direction of the connecting area. The inner contact area basically projects away from the outer contact area and preferably exactly/approximately in the direction of the reflection element as seen from the region of transition.

Advantageous embodiments are claimed in the dependent claims and are explained in more detail below.

It is advantageous if the first contact area is formed as an inner contact area located inside a space defined by the bearing element and the reflection element, and the second contact area is formed as an outer contact area. The result is that the force flow from the region of transition of the main body of the bearing element into the coupling region of the bearing element is split in two different, preferably opposite directions. The total force flow is now distributed as evenly as possible, which avoids breaking of the bearing element and results in better retention of the bearing element on the spherical connection region of the adjustment element.

Since the first contact area is located inside the space defined by the bearing element and the reflection element, this contact area is also protected from dirt and contamination, which enables good and low-friction use in the long term and ensures adjustability even under difficult conditions.

If the first contact area and the second contact area each have inner contour segments in the form of spherical sections, it is possible to adjust one or both contact areas to the spherical connection region particularly efficiently to ensure good adjustability.

An advantageous embodiment is also characterized in that the inside of the coupling region (of the bearing element) and the outside of the connection region (of the adjustment element) are matched to each other in such a way that both components define a pivot point about which the bearing element is pivotable relative to the adjustment element. When using the rear view system, the user can then easily adjust the angular position of the two components relative to each other as required.

It is advantageous if the connection region has counter contact areas shaped like spherical sections. This facilitates swiveling/pivoting.

It is also advantageous if the counter contact areas are adapted to the contact areas in contact with them, in particular with regard to their contour. This makes it possible, for example, to integrate subregions that deviate from a spherical geometry or to use ellipsoidal subregions.

If the counter contact areas are connected via flattening regions or a flattening region, assembly is facilitated on the one hand and a spring element is relieved on the other hand, and redundant dimensioning on the contact surfaces is/are avoided.

For series production, it has proven advantageous if the bearing element is designed as a rear wall and/or the adjustment element as a (rotary) pin, preferably made of plastic such as polyamide, e.g. as an integral/one-piece, single-material component.

It is expedient if the adjustment element is fastened to the bearing element, for example via a form-fit and/or force-fit.

A particularly good fit of the two components to each other is ensured if the adjustment element has a receptacle for connecting a vehicle-fixed holder/telescopic rod holder, rod or (telescopic) pipe or is itself designed accordingly.

In addition, it has proven useful if the receptacle is designed as a blind hole whose bottom is stepped to make twisting impossible.

The mounting options can be made more varied if the adjustment element has an indirect or direct connecting area to the vehicle, e.g. the blind hole.

The weight can be optimized if the two contact areas together form shell shaped like a spherical section which opens into the main body in the region of transition.

It is beneficial to the compactness of the system if there is an angle $\alpha$ and/or an angle $\beta$ of 15° to 125°+/−5°. It is advantageous if the main body in the region of transition meets the shell at an angle $\alpha$ of 15° to 125°+/−58, preferably 90°+/−2.5°, wherein the angle $\alpha$ is between, on the one hand, an imaginary straight line through the region of the transition from the main body to the coupling region and, on the other hand, an imaginary straight line running in the axial direction through the (spherical) center point of the connection region and/or the pivot point. The first of the two imaginary straight lines can, in a special case, be located in the separation surface, on both sides of which the inner and outer contact areas are arranged.

If the main body defines an imaginary bearing line in the direction of the pivot point, which intersects a theoretical sphere around the pivot point with a diameter smaller than or equal to approx. 60 mm, preferably approx. 50 mm, more preferably exactly 60 mm, the force curve in the direction of the center of the connection region is particularly good.

It has also proven useful if a glass element is connected to the bearing element, for example via a form-fit and/or force-fit, in particular via a clip solution, and the glass element is designed as mirror glass.

An advantageous embodiment is also characterized in that a spring force is applied to (at least/only) one of the two contact areas, preferably the first contact area, or both contact areas in the mounted state, which pushes the coupling region at least in each of the contact areas in the direction of the interior of the coupling region, preferably in the direction of the pivot point. Self-fixing after an adjustment is thus facilitated and variability for achieving a good rendering of the driver's rearward field of view is the result.

It is convenient if the spring force is provided by a spring element, such as a ring or a clamp. The spring element may have one or more coils.

Such a separate spring element allows the spring force to be specifically adjusted. It has also proven useful if the ring has a closed or open, e.g. slotted, cross-section. This improves assembly in particular in the second case and fatigue strength/continuous loading capability in particular in the first case.

In order to ensure a long service life with unchanged technical framework conditions, it is advantageous if the spring element is made/created from a metallic material, for example comprising an iron alloy, e.g. in the form of spring steel.

In order to ensure a simple modular design, it is advantageous if the spring element is designed as a compression spring that rests against the outside of the first contact area or the second contact area. This also facilitates subsequent application.

For the connection of the individual components to each other, in particular to make it impossible to lose the components, it is advantageous if a recess, for example in the form of a trough, fluting or channel, is formed on the outside of the (respective) contact area, in which the spring element rests/sits/is arranged in the assembled state.

In order to keep a sliding area between the bearing element and the adjustment element permanently clean/free of contamination, it is advantageous if a sealing function is implemented between one of the contact areas and its associated counter contact area, preferably the first contact area and its associated counter contact area, via the bearing element and/or the adjustment element, e.g. via an integrally formed sealing lip on one or both components, and/or an additional sealing element is installed/interposed between the bearing element and the adjustment element. A cleaning effect is then achieved which is also known in a similar form from an eyelid on an eye. A weak point known from the prior art can be eliminated in this way. Entering contamination is stopped and friction which would otherwise occur during the movement of the individual parts relative to each other can then no longer lead to undesirable wear, which otherwise always reduces the service life. It should also be emphasized that especially if, for example, elasticity-increasing slits or holes are present in the contact area—preferably only in the inner contact area anyway—wear can then be prevented. A relatively tight system is the result in this embodiment.

It is advantageous for assembly if the coupling region is completely or at least in sections/partially elastic.

It is also advantageous if (primarily) only the first contact area and/or (secondarily) only the second contact area are provided with changes in geometry that cause elasticity, such as thinning, slits, openings, grooves, corrugations and/or similar designs.

In order to be able to specify different operating positions, it is advantageous if the coupling region and the connection region are designed to form an index geometry via which certain predefined relative positions can be assumed between the bearing element and the adjustment element.

It is advantageous if the index geometry is formed in the manner of a groove-and-spring interlock.

It has proven useful if the coupling region has at least one groove/channel/fluting or a plurality of them on its inside and wherein at least one or more of them (each) engages as a projection on the outside of the adjustment element or, as an alternative/supplement, the adjustment element has at least one groove/channel/fluting or a plurality of them on its outside and wherein at least one groove/channel/fluting or a plurality of them (each) engages as a projection on the inside of the coupling region of the bearing element.

If the groove/channel/fluting and/or the projection has a V-shaped, U-shaped, roof-shaped or polygonal contour in cross-section and/or both are formed to fit together (almost) without play, wobble-free adaptation of the adjustment element to the bearing element and vice versa is possible.

In order to be able to make the adjustment stepless, it is advantageous if the projection is installed/inserted in the groove/channel/fluting (continuously/discontinuously) so that it is movable/slidable.

Furthermore, it has also proven to be advantageous if grooves/channels/flutings are present on opposite outer sides of the adjustment element as seen from the pivot point, two of which are each filled with a projection of the adjustment element at least in one section and at least two or an integral multiple of grooves/flutings/channels remain free of projections.

If the grooves/channels/flutings are evenly distributed over the inner circumference of the coupling region, e.g. every 908, 45°, 22.5°, 12.25° or 6.125°, adjustments can be provided as required.

The invention ultimately relates to such an embodiment in which a mirror head is formed and/or a head adjuster or a glass adjuster is included.

If the inner contact area and/or the outer contact area is radially closed and preferably has elastic partial areas, simple assembly is made possible with the exclusion of contamination possibilities or a provision of a dirt protection.

The invention ultimately also relates to an assembly method for coupling a bearing element of the indirect rear view system of the type according to the invention to the adjustment element, wherein the bearing element is moved from the direction of the reflection element in the direction of the adjustment element, for example via a counter contact area formed there. Snapping-on is the result.

A further development is seen in the fact that the coupling region forming the second contact area and/or the first contact area is first expanded when it is pushed onto the adjustment element and then elastically springs back.

It is advantageous if the coupling region is clipped onto a spherical thickening/onto the spherical connection region of the adjustment element.

In other words, the invention relates to an indirect view system for a vehicle, wherein the angle $\alpha$ between a horizontal ball center axis and a leg of the ball center to the point of contact of the rear wall on the contact area ranges from a minimum of 15° to a maximum of 125°.

A further development can also be expressed in that the adjustment element is formed integrally with the connecting area to the vehicle and in active surfaces to the bearing element.

In addition, the direction of the rear wall in the region of the contact area can be designed in such a way that it cuts through a theoretical sphere with a diameter of 60 mm in a theoretical extension towards the center of the sphere.

It is also considered advantageous that the adjustment element is mounted to the bearing element from the direction of the reflection element from the inside to the outside and the outer contact area and the inner contact area are radially closed or the outer contact area is radially closed and the inner contact area has elastic sections. Slits, cutouts, grooves and corrugated shapes are suitable here. Segmentation or, respectively, implementation of a pushbutton principle is thus easier to achieve. The slits produce an elastic spring effect of the contact area.

In other words, the invention also relates to an assembly of the adjustment element to the bearing element from the direction of the reflection element from the inside to the outside, wherein the outer and inner contact areas of the bearing element are radially closed and the adjustment element has elastic subregions.

If pressure is applied to the contact areas of the adjustment element at the outer or inner contact areas of the bearing element via a spring element, the friction is increased via the spring so that it forces a higher adjustment force for the adjustment.

It is advantageous if a spring element applies pressure to the contact areas of the bearing element at the outer or inner contact areas of the adjustment element.

It is advantageous if the spring element is a metal spring clip or an open or closed metal ring spring with one or more coils.

It is also advantageous if a sealing function is integrated in the outer contact area of the bearing element and the outer contact area of the adjustment element. Molded-on sealing lips on the bearing element are just as conceivable as additional sealing lips with a second material that are molded on. Additional sealing elements, which are mounted, are also conceivable.

If the indirect view system is mounted via a pipe or the adjustment element is mounted directly or indirectly on the vehicle, and the adjustment element is designed in one piece or in several pieces in order to fasten the pipe, further alternatives can be realized. A pipe may be mounted on the vehicle in the case of direct mounting, or an additional retaining element, such as a telescopic rod holder, may be used in the case of indirect mounting.

It is advantageous if the pipe is clearly defined, positioned and fixed in the adjustment element via form fit, i.e. corresponding geometric shapes. The advantage of this is that the unambiguous positioning of the indirect view system ensures that the required field of view is always maintained, e.g. in order to meet customer requirements or to comply with legal requirements—such as the standards UN/ECE-R46 or ISO 5721-2 or ISO 5006. In addition, the mirror head with the adjustment element is mounted so that it cannot be lost and cannot 'fall off' if the frictional connection is lost or reduced.

It is also advantageous if the indirect view system is attached directly to the vehicle via the adjustment element, e.g. via an adjustment element mounted on the vehicle, and the adjustment element is made in one piece or in several pieces.

It is also advantageous if different operating positions between the adjustment element and the bearing element can be set radially around the horizontal ball center axis via an index geometry between the adjustment element and the bearing element, e.g. in the manner of a groove and spring. The operating positions can still be selected after the mirror head has been mounted, since the index geometry is elastic. This also makes it possible to achieve collision protection through damping and resilience of the index geometry.

As explained, it is advantageous if the indirect view system is a mirror head and/or the indirect view system is a head adjuster or glass adjuster.

The solution according to the invention has numerous advantages. For example, the force flow from the bearing element to the adjustment element is optimized, since the force is introduced between the inner and outer contact areas and the force is thus better transmitted from the bearing element to the adjustment element. The number of components is also reduced, since the function and geometric design are integrated. The contact areas of the bearing element and of the adjustment element wrap around each other and no additional sliding element or joining element is required. Assembly is simplified, since fewer components are required. This also reduces costs. In one embodiment, the adjustment mechanism only has to be 'snapped' into place, and no joining element such as a screw or locking bolt is required.

The index geometry in the form of a groove-and-spring combination enables an adjustment to be made when a greater torque is applied, for example to switch from vertical to horizontal mounting.

Another positive aspect relates to guiding an electrical cable, which can be used to connect electrical modules such as heating foils, for example on the rear side of the mirror (i.e. inside the space bounded by the glass element and the bearing element), blind spot and/or parking distance systems. Such electrical cables/supply lines can then be guided through the interior of the spherical connection region of the adjustment element or, respectively, the sphere formed by the adjustment element.

Figure 2:
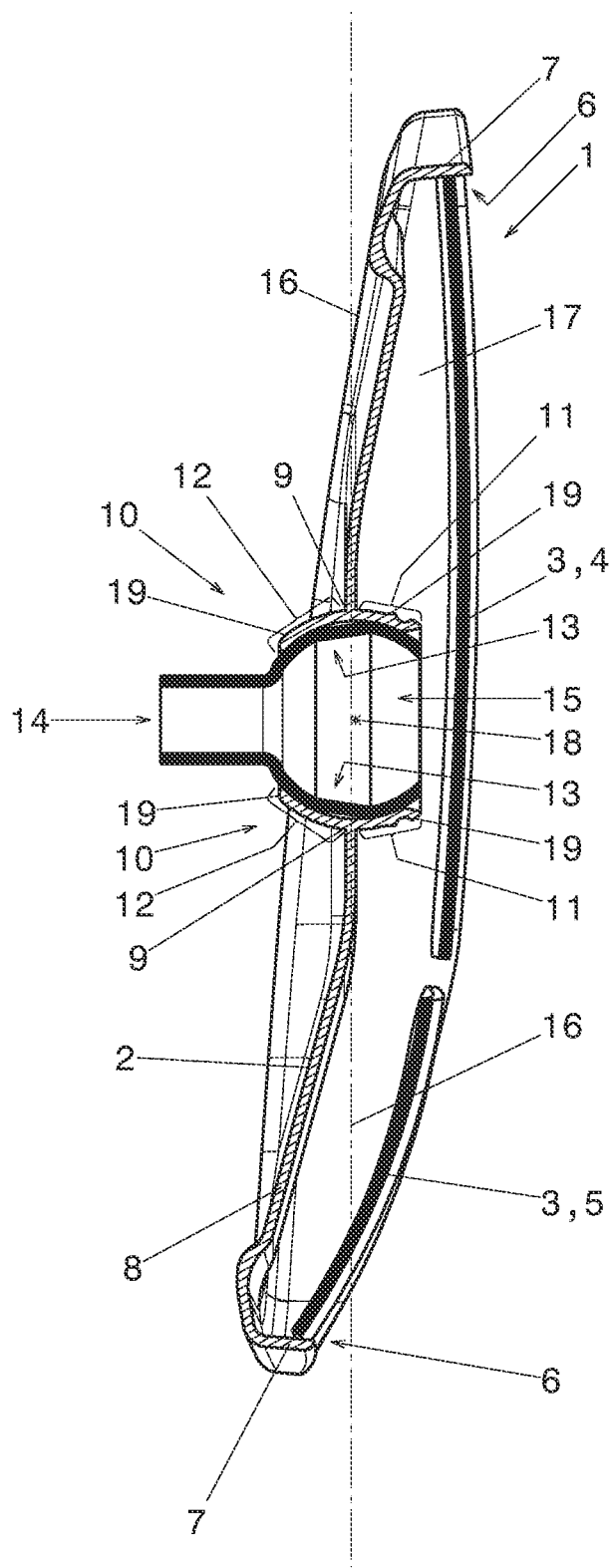

The invention is explained in more detail below with the aid of a drawing, in which various embodiments are shown. The following is shown:

FIG. 1 shows a top view of a rear view system of the type according to the invention with a view of the reflection element, FIG. 2 shows a longitudinal section along line II through the rear view system of FIG. 1, FIG. 3 shows the rear view system according to a representation of FIG. 2 with a modified adjustment element, FIG. 4 shows an isometric view of the rear view system of FIG. 3 without reflection element slightly oblique to the mounting direction, FIG. 5 shows the rear view system of FIG. 3 with spring elements on both sides of an imaginary separation surface, FIG. 6 shows a modified embodiment compared to FIG. 5, in which the separation element has a more acute angle in the region of the transition from the main body of the carrier element to the coupling region than in the embodiment shown in FIG. 5, FIG. 7 shows an embodiment comparable to the embodiments of FIGS. 5 and 6 but with a different angle and shape of the main body, FIG. 8 shows an isometric view comparable to FIG. 4 of a different embodiment compared to FIG. 5, namely without slits in the bearing element, FIG. 9 shows the embodiment according to FIG. 5 with a pipe present in the adjustment element, FIG. 10 shows a magnification of region X from FIG. 3, FIG. 11 shows a top view of a first embodiment of a spring element as used in the embodiment of FIG. 9, FIG. 12 shows a section through the spring element of FIG. 11 along line XII, FIG. 13 shows a variant of a spring element as shown in FIGS. 11 and 12 in a manner of representation comparable to FIG. 11, FIG. 14 shows a section along line XIV through the spring element of FIG. 13, FIG. 15 shows a magnification of region XV through the embodiment of FIG. 9 with spring elements not yet attached, FIG. 16 shows a longitudinal section along line XVI through the embodiment of FIG. 15, FIG. 17 shows a perspective view of an assembled rear view system, FIG. 18 shows a section along line XVIII through the embodiment of FIG. 17, FIG. 19 shows a section through the representation of the embodiment of FIG. 18 along line XIX.

Figure 20:
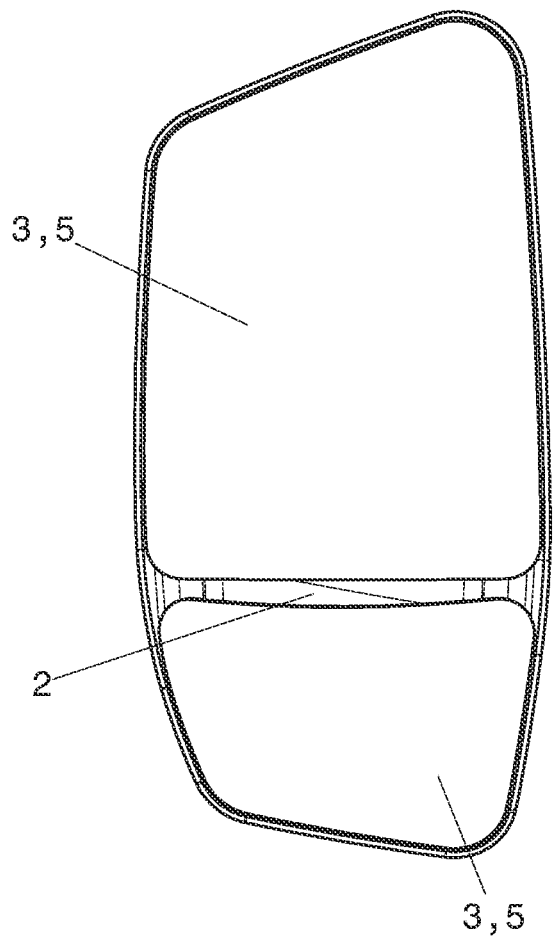
Figure 21:
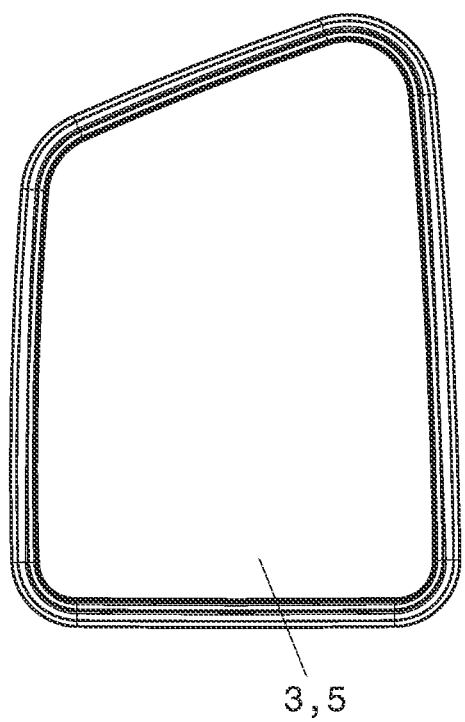
Figure 22:
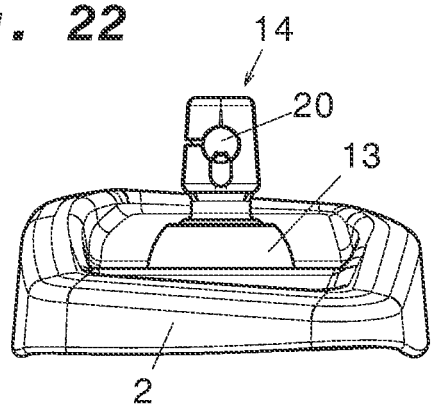
Figure 23:
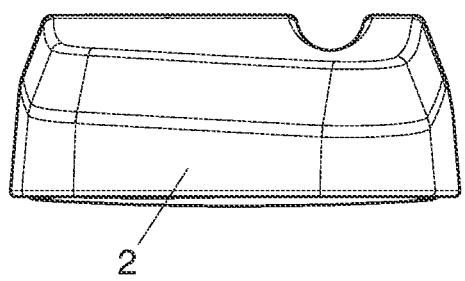
Figure 24:
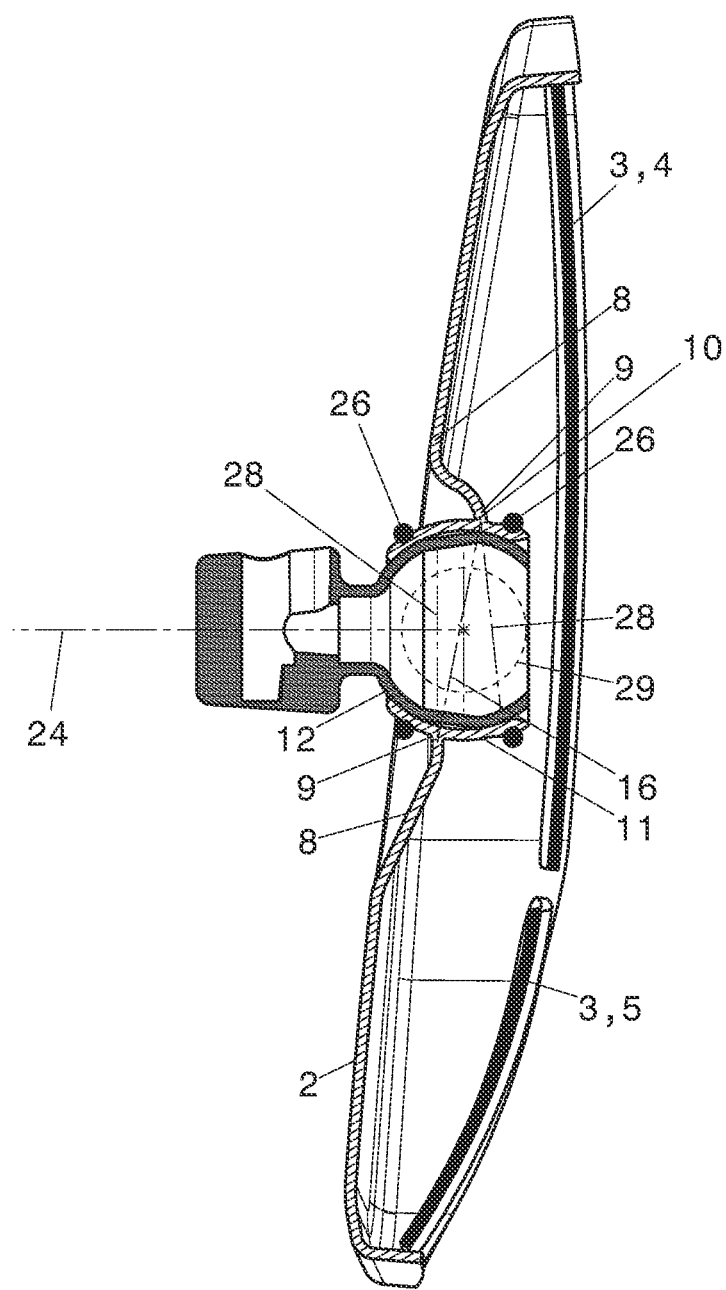

FIG. 20 shows a front view of a head adjuster of the rear view system according to the invention, FIG. 21 shows a singular representation on a glass adjuster according to the invention, FIG. 22 shows an elevated view to FIG. 20, FIG. 23 shows an elevated view of FIG. 21 of the assembled rear view system according to the invention, and FIG. 24 shows a further embodiment in a representation type corresponding to FIGS. 5 to 7.

The figures are merely schematic in nature and serve only to aid understanding the invention. Identical elements are provided with the same reference signs. Features of the individual embodiments can be interchanged.

FIG. 1 shows a top view from the rear of a vehicle of a first embodiment of an indirect rear view system 1. Two reflection elements 3, namely an upper mirror glass 4 and a lower mirror glass 5, are attached to a bearing element 2.

The attachment of the two reflection elements 3 to the bearing element 2 is shown in more detail in the longitudinal sectional view according to FIG. 2.

The bearing element 2 provides a fixation 6 at the outer ends 7. From these outer ends 7, the bearing element 7 extends with its main body 8 to a region of a transition 9. There, the main body 8 transitions into a coupling region 10. The coupling region 10 has a first contact area 11 and a second contact area 12. The coupling region 10 with its first contact area 11 and its second contact area 12 surrounds a spherical connection region 13 of an adjustment element 14. The axial direction in which the coupling region 10 is placed on the connection region 13 is indicated by the reference sign 15.

An imaginary separation surface 16—here as a separation plane—runs through the regions of the transition 9, i.e. precisely through that region 9 of the transition at which the main body 8 transitions into the coupling region 10.

For understanding the separation surface 16, it is significant that in certain—but not necessarily all—sections through a pivot point 18, about which the bearing element 2 is pivotable relative to the adjustment element 14, the separation surface 16 includes imaginary straight lines through the regions 9 of the transition from the main body 8 into the coupling region 10.

If the region 9 of the transition 9 is rotationally symmetrical about the axis 24, a separation surface 16 in the form of a separation plane can result in a certain special case, which includes straight lines through all regions 9 of said transition in all angular positions.

However, this does not always have to be the case, for example, if the region 9 of the transition has projections/lugs/beads or recesses/depressions extending in the direction of the axis 24, which would only be recognizable in two dimensions in different cross sections.

The first contact area 11 is an inner contact area, since it is arranged in a space 17 formed by the bearing element 2 and the two reflection elements 3. Outside of this space 17, on the other side of the imaginary separation surface 16 (as seen from the first contact area 11), is the second contact area 12, which is an outer contact area.

The two contact areas 11 and 12 have inner contour segments shaped like spherical sections, which are in planar or linear contact with a portion in the form of a spherical section (respectively) of the connection region 13.

The bearing element 2, comprising the main body 8 and the coupling region 10, is made of plastic, preferably by injection molding, and has a largely uniform wall thickness. The connection region 13, which is spherical, ball-like or has spherical section regions, surrounds the pivot point 18. When the reflection element is adjusted, the first contact area 11 and the second contact area 12 move (together), which are part of the coupling region 10 and are firmly attached to the main body 8 of the bearing element 2 via the region of transition 9, rubbing on the outer surface of counter contact areas 19. These counter contact areas 19 are provided at the same height as the two contact areas 11 and 12, but belong to the adjustment element 14.

The bearing element 2 basically acts as a rear wall.

A further development of the adjustment element 14 is shown in FIG. 3. There, the adjustment element 14 has a receptacle 20 with a blind hole 21. The bottom 22 of the blind hole 21 is stepped.

In anticipation of FIG. 9, the possibility of inserting a pipe 23 into the blind hole 21 is already be mentioned. The pipe 23 may also be a rod, a telescopic tube or a telescopic rod. The adjustment element 14 is also made of plastic, in particular by injection molding, and is hollow on the inside.

The main body 8 meets the coupling region 10 at a special point, namely in the region of transition 9 of the main body 8 into the coupling region 10. If this point is theoretically extended with the pivot point 18, an angle to an imaginary horizontal straight line 24 through the pivot point 18 can be measured. This angle is denoted by α. It may be between 15° and 125°. In the embodiment of FIG. 3, it is exactly 90°. In fact, in this embodiment, said special point is located in the separation surface 16, and thus also one leg of the angle α. In other words, the imaginary separation surface 16 contains the portion of the main body 8 that is closest to the coupling area.

In addition, the main body 8 meets the coupling region 10 at a special angle relative to an imaginary horizontal straight line 24. If the main body 8 meeting the coupling region in the region of transition 9 is extended, an extension or imaginary bearing line 28 is obtained. A further angle is set relative to the imaginary straight lines 24. This angle is referred to as angle R and may be between 15° to 125°. In the embodiment of FIG. 3, it is exactly 90°. In the embodiment of FIG. 5, both the angle α and the angle β are 90°. In the embodiment of FIG. 6, the angle α is 90° and the angle β is 66°.

In the embodiment shown in FIG. 5, a trough/groove/channel/fluting 25 is incorporated on the surface of the first contact area 11 remote from the adjustment element to provide a good fit for a spring element 26. A second spring element 26, which is identically constructed to the spring element 26 inserted in the groove/channel/fluting 25 or is differently constructed to it, is also provided there.

The two counter contact areas 19 are connected by a flattening region or respectively a flattening 27. An imaginary elongation 28 of the main body 8 in the coupling region intersects an imaginary sphere 29 with a diameter of 50 mm, 60 mm or 70 mm. The imaginary elongation 28 corresponds to a bearing line. The imaginary sphere 29 is thus a theoretical sphere. The interaction of the adjustment element 14 with the coupling region 10 of the bearing element 2 can be clearly seen in the representation of FIG. 8 if the upper and lower mirror glasses 4 and 5 are omitted.

Deviating from the embodiment according to FIG. 5, the angle α as well as the angle 3 may also be selected differently.

For example, the angle 1 in FIG. 6 is approx. 66° or 70°, i.e. an acute angle. The angle α in the embodiment according to FIG. 7 is about 85°, thus also an acute angle. However, obtuse angles are also conceivable. For example, 100°, 110°, 120° are just as conceivable.

The spring elements 26 used in the embodiment of FIG. 9 are shown by way of example in FIGS. 11 to 14. The spring element 26 of FIGS. 13 and 14 is designed in the form of a clamp and that of FIGS. 11 and 12 in the form of a ring. In particular, the spring element 26 is a single or multiple wound spring ring.

The magnification of FIG. 10 clearly shows the force fit between the counter contact areas 19 on the one hand, and the two contact areas 11 and 12 on the other hand. The force required for this is provided by the rigidity of the material of the bearing element 2 on the one hand and the spring elements 26 on the other hand.

FIGS. 15 and 16 show the connection of the pipe 23 to the receptacle 20 of the adjustment element 14 in different longitudinal sections. The overall structure can be seen in FIG. 17, whereas an index geometry 30 can be seen in magnified representation in FIGS. 18 and 19.

There are elasticity-inducing structural measures 31 in the first contact area 11, namely slits 32. On the inside of the coupling region 10 there are guiding measures in the form of grooves/channels/flutings 34. These grooves 34 are offset by 90° viewed over the circumference, and the upper and lower grooves 34 in the direction of gravity are form-fittingly filled by projections 35 at a point/segment spanning the cross section, leaving adjacent segments free.

FIGS. 20 to 23 complete the overall geometric overview.

FIG. 24 shows another embodiment wherein the separation surface 16 is oblique to the imaginary straight line 24. The imaginary extensions/bearing lines 28 are not parallel to each other. Rather, the imaginary elongation/bearing line 28 extending from the upper (i.e. above the imaginary straight lines 24) region of the transition 10 moves away from the part of the bearing element 7 present below the imaginary straight line 24. Connecting each point of the region 10 through the imaginary straight line 24 to the opposite region 10 results in a separation plane in this embodiment, which does not run through the pivot point 18 but which might be the case in other embodiments. Although the separation surface 16 is formed as a separation plane here, it may alternatively be a free surface instead of a plane.

LIST OF REFERENCE SIGNS 1 indirect rear view system
2 bearing element
3 reflection element
4 upper mirror glass
5. lower mirror glass
6 fixation
7 outer end of the bearing element
8 main body
9 region of a transition
10 coupling region
11 first contact area
12 second contact area
13 spherical connection region
14 adjustment element
15 axial direction/mounting direction
16 imaginary separation surface
17 space
18 pivot point
19 counter contact area
20 receptacle
21 blind hole
22 bottom
23 pipe
24 imaginary straight line
25 trough/groove/channel/fluting
26 spring element
27 flattening region/flattening
28 imaginary elongation/bearing line
29 imaginary sphere/theoretical sphere
30 index geometry
31 structural measure
32 slit
33 guiding measure
34 groove/channel/fluting
35 projection

The invention claimed is:

1. An indirect rear view system for a motor vehicle, having a bearing element for fastening at least one reflection element, wherein the bearing element is provided as an integral, single-material component and forms a coupling region for position-variable attachment to an adjustment element which is attachable to the vehicle, wherein the coupling region has a first contact area and a second contact area axially offset with respect thereto for contacting a spherical connection region of the adjustment element, wherein on both sides of a pivot point, about which the bearing element can be pivoted relative to the adjustment element, an imaginary separation surface being provided as a separation plane runs through a region of a transition of a main body of the bearing element into the coupling region of the bearing element, and wherein the first contact area is arranged on one side of the imaginary separation surface and the second contact area is arranged on the opposite side of the imaginary separation surface, and wherein the connection region of the adjustment element has counter contact areas shaped like spherical sections and adapted to the contact areas of the coupling region in contact with them, which counter contact areas are connected via flattening regions or a flattening region.

2. The indirect rear view system according to claim 1, wherein the first contact area is formed as an inner contact area located inside a space defined by the bearing element and the reflection element, and the second contact area is formed as an outer contact area.

3. The indirect rear view system according to claim 1, wherein the first contact area and the second contact area each have inner contour segments in the form of spherical section.

4. The indirect rear view system according to claim 1, wherein the inside of the coupling region and the outside of the connection region are matched to each other in such a way that both components define a pivot point, about which the bearing element is pivotable relative to the adjustment element.

5. The indirect rear view system according to claim 1, wherein the connection region has counter contact areas shaped like spherical sections.

6. The indirect rear view system according to claim 1, wherein the two contact areas together form a shell shaped like a spherical section, which open into the main body in the region of transition or a sealing function is implemented between one of the contact areas and its associated counter contact area.

7. The indirect rear view system according to claim 1, wherein an angle $\alpha$ or an angle $\beta$ of 15° to 125°+/−5° is present.

8. The indirect rear view system according to claim 1, wherein a spring force is applied to one of the two contact areas or both contact areas in the mounted state, which pushes into the coupling region at least in the respective contact area in the direction of the interior of the coupling region.

9. The indirect rear view system according to claim 1, wherein the main body defines an imaginary bearing line in the direction of the pivot point, which intersects a theoretical sphere around the pivot point with a diameter smaller than or equal to approx. 60 mm.

10. An assembly method for coupling a bearing element of the indirect rear view system according to claim 1 to the adjustment element, wherein the bearing element is moved from the direction of the reflection element in the direction of the adjustment element.

11. An indirect rear view system for a motor vehicle, having a bearing element for fastening at least one reflection element, wherein the bearing element and forms a coupling region for position-variable attachment to an adjustment element which is attachable to the vehicle, wherein the coupling region has a first contact area and a second contact area axially offset with respect thereto for contacting a spherical connection region of the adjustment element, wherein on both sides of a pivot point, about which the bearing element can be pivoted relative to the adjustment element, an imaginary separation surface being provided as a separation plane runs through a region of a transition of a main body of the bearing element into the coupling region of the bearing element, and wherein the first contact area extends directly from one side of the imaginary separation surface and the second contact area extends directly from the opposite side of the imaginary separation surface, and wherein the connection region of the adjustment element has counter contact areas shaped like spherical sections and adapted to the contact areas of the coupling region in contact with them, which counter contact areas are connected via flattening regions or a flattening region.

12. The indirect rear view system according to claim 11, wherein the first contact area is formed as an inner contact area located inside a space defined by the bearing element and the reflection element, and the second contact area is formed as an outer contact area.

13. The indirect rear view system according to claim 11, wherein the first contact area and the second contact area each have inner contour segments in the form of spherical section.

14. The indirect rear view system according to claim 11, wherein the inside of the coupling region and the outside of the connection region are matched to each other in such a way that both components define a pivot point, about which the bearing element is pivotable relative to the adjustment element.

15. The indirect rear view system according to claim 11, wherein the connection region has counter contact areas shaped like spherical sections.

16. The indirect rear view system according to claim 11, wherein the two contact areas together form a shell shaped like a spherical section, which open into the main body in the region of transition or a sealing function is implemented between one of the contact areas and its associated counter contact area.

17. The indirect rear view system according to claim 11, wherein an angle $\alpha$ or an angle $\beta$ of 15° to 125°+/−5° is present.

18. The indirect rear view system according to claim 11, wherein a spring force is applied to one of the two contact areas or both contact areas in the mounted state, which pushes into the coupling region at least in the respective contact area in the direction of the interior of the coupling region.

19. The indirect rear view system according to claim 11, wherein the main body defines an imaginary bearing line in the direction of the pivot point, which intersects a theoretical sphere around the pivot point with a diameter smaller than or equal to approx. 60 mm.

20. The indirect rear view system according to claim 11, wherein the two contact areas are connected by a flattening region.

* * * * *